United States Patent
Pasadyn et al.

(10) Patent No.: US 6,687,561 B1
(45) Date of Patent: Feb. 3, 2004

(54) METHOD AND APPARATUS FOR DETERMINING A SAMPLING PLAN BASED ON DEFECTIVITY

(75) Inventors: Alexander J. Pasadyn, Austin, TX (US); Christopher A. Bode, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 49 days.

(21) Appl. No.: 10/115,432

(22) Filed: Apr. 3, 2002

(51) Int. Cl.⁷ .............................................. G06F 19/00
(52) U.S. Cl. ..................... 700/110; 700/117; 700/109
(58) Field of Search ................................ 700/110, 117, 700/109

(56) References Cited

U.S. PATENT DOCUMENTS

| | | | |
|---|---|---|---|
| 5,402,367 A | * 3/1995 | Sullivan et al. | 703/6 |
| 5,586,039 A | * 12/1996 | Hirsch et al. | 700/95 |
| 5,657,252 A | * 8/1997 | George | 702/83 |
| 5,822,218 A | * 10/1998 | Moosa et al. | 716/4 |
| 5,896,294 A | * 4/1999 | Chow et al. | 700/121 |
| 5,982,920 A | * 11/1999 | Tobin et al. | 382/145 |
| 5,999,003 A | * 12/1999 | Steffan et al. | 324/537 |
| 6,002,989 A | * 12/1999 | Shiba et al. | 702/84 |
| 6,281,962 B1 | * 8/2001 | Ogata et al. | 355/27 |
| 6,374,199 B1 | * 4/2002 | Sugimoto | 703/2 |
| 6,403,385 B1 | * 6/2002 | Venkatkrishnan et al. | 438/14 |
| 6,408,219 B2 | * 6/2002 | Lamey et al. | 700/110 |
| 6,421,574 B1 | * 7/2002 | Steffan et al. | 700/121 |
| 6,477,432 B1 | * 11/2002 | Chen et al. | 700/51 |
| 6,577,972 B2 | * 6/2003 | Yanaru et al. | 702/83 |

OTHER PUBLICATIONS

"Key Considerations in the Development of Defect Sampling Methodologies", McIntyre, Nurani, Akella—Advanced Micro Devices. 1996 IEEE/SEMI Manufacturing Conference.*

□□"Optimized Sample Planning for Wafer Defect Inspection", Williams et al. IEEE 1999.*

* cited by examiner

Primary Examiner—Leo Picard
Assistant Examiner—Michael D. Masinick
(74) Attorney, Agent, or Firm—Williams, Morgan & Amerson, P.C.

(57) ABSTRACT

A method includes processing a plurality of workpieces in accordance with an operating recipe. A defectivity metric is determined based on the operating recipe. A sampling plan for measuring a characteristic of selected workpieces processed using the operating recipe is determined based on the defectivity metric. A manufacturing system includes a process tool and a sampling controller. The process tool is configured to process a plurality of workpieces in accordance with an operating recipe. The sampling controller is configured to determine a defectivity metric based on the operating recipe and determine a sampling plan for measuring a characteristic of selected workpieces processed using the operating recipe based on the defectivity metric.

35 Claims, 3 Drawing Sheets

METHOD AND APPARATUS FOR DETERMINING A SAMPLING PLAN BASED ON DEFECTIVITY

BACKGROUND OF THE INVENTION

1. Field of the Invention

This invention relates generally to the field of semiconductor device manufacturing and, more particularly, to a method and apparatus for determining a sampling plan based on defectivity.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

Data gathered during the course of wafer processing is used to identify and attempt to mitigate the effects of process and equipment variations by implementing automatic control techniques based on the collected feedback. Current semiconductor processing techniques typically collect meteorology data at a fixed rate (e.g., every fourth lot processed in a tool) or by pre-assigning a fixed percentage of lots for measurement. Because lots are not typically processed in a particular order, the percentage technique sometimes results in periods where multiple lots are measured consecutively, followed by periods where no lots are measured. Such static sampling plans sometimes do not diagnose process or system issues expeditiously. As a result defective wafers could be manufactured, necessitating costly rework or scrapping of the wafers.

Different processes performed during the fabrication of devices, by nature, have different propensities for inducing defects in the processed devices. Typically, one process tool may be used to perform a process using different operating recipes (e.g., different etching recipes for different process layers formed on a wafer). Static sampling plans typically measure a predetermined number of wafers processed in the process tool. Such static sampling plans sometimes fail to provide adequate data for effective process control or fault detection given the different defectivity characteristics of the processes being performed.

The present invention is directed to overcoming, or at least reducing the effects of, one or more of the problems set forth above.

SUMMARY OF THE INVENTION

One aspect of the present invention is seen in a method including processing a plurality of workpieces in accordance with an operating recipe. A defectivity metric is determined based on the operating recipe. A sampling plan for measuring a characteristic of selected workpieces processed using the operating recipe is determined based on the defectivity metric.

Another aspect of the present invention is seen in a manufacturing system including a process tool and a sampling controller. The process tool is configured to process a plurality of workpieces in accordance with an operating recipe. The sampling controller is configured to determine a defectivity metric based on the operating recipe and determine a sampling plan for measuring a characteristic of selected workpieces processed using the operating recipe based on the defectivity metric.

BRIEF DESCRIPTION OF THE DRAWINGS

The invention may be understood by reference to the following description taken in conjunction with the accompanying drawings, in which like reference numerals identify like elements, and in which.

Figure 1:
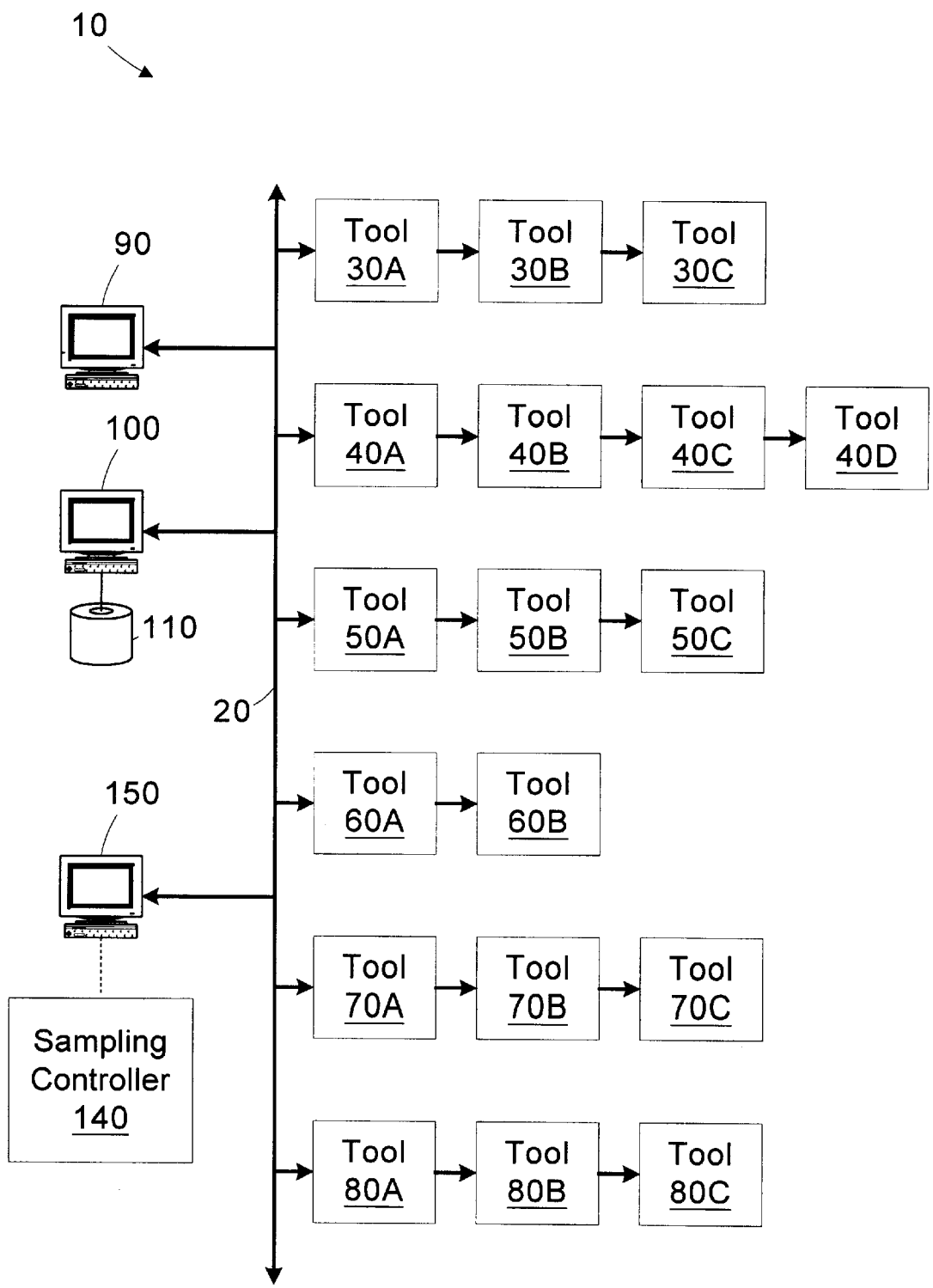
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items including, but not limited to microprocessors, memory devices, digital signal processors, application specific integrated circuits (ASICs), or other similar devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment, include metrology tools, photolithography steppers, etch tools, deposition tools, polishing tools, rapid thermal processing tools, implantation tools, etc. The tools 30–80 are illustrated in a rank and file grouping for illustrative purposes only. In an actual implementation, the tools may be arranged in any order or grouping. Additionally, the connections between the tools in a particular grouping are meant to represent only connections to the network 20, rather than interconnections between the tools.

A manufacturing execution system (MES) server 90 directs the high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, etc.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The distribution of the processing and data storage functions amongst the different computers or workstations in FIG. 1 is generally conducted to provide independence and central information storage. Of course, different numbers of computers and different arrangements may be used.

The manufacturing system 10 also includes a sampling controller 140 executing on a workstation 150. As described in greater detail below, the sampling controller 140 monitors the operating recipes implemented by the tools 30–80 and implements different sampling plans for measuring the output characteristics of the workpieces processed by the tools 30–80 based on the expected defectivity characteristics of the operating recipes. The defectivity characteristics of an operating recipe include the propensity of the process implemented using the operating recipe to induce defects in the processed device. Exemplary defects include particle contamination defects, missing or extra patterns, or electrical faults or defects. Although the MES server 90 and sampling controller 140 are shown as separate entities, they may be integrated into a single unit.

The MES server 90 stores metrology data related to the particular tools 30–80 used to process each lot of wafers in the data store 110. The metrology data may include feature measurements, process layer thicknesses, electrical performance characteristics, defect measurements, surface profiles, etc. Maintenance history for the tools 30–80 (e.g., cleaning, consumable item replacement, repair) may also be stored in the data store 110 by the MES server 90 or by a tool operator.

Figure 2:
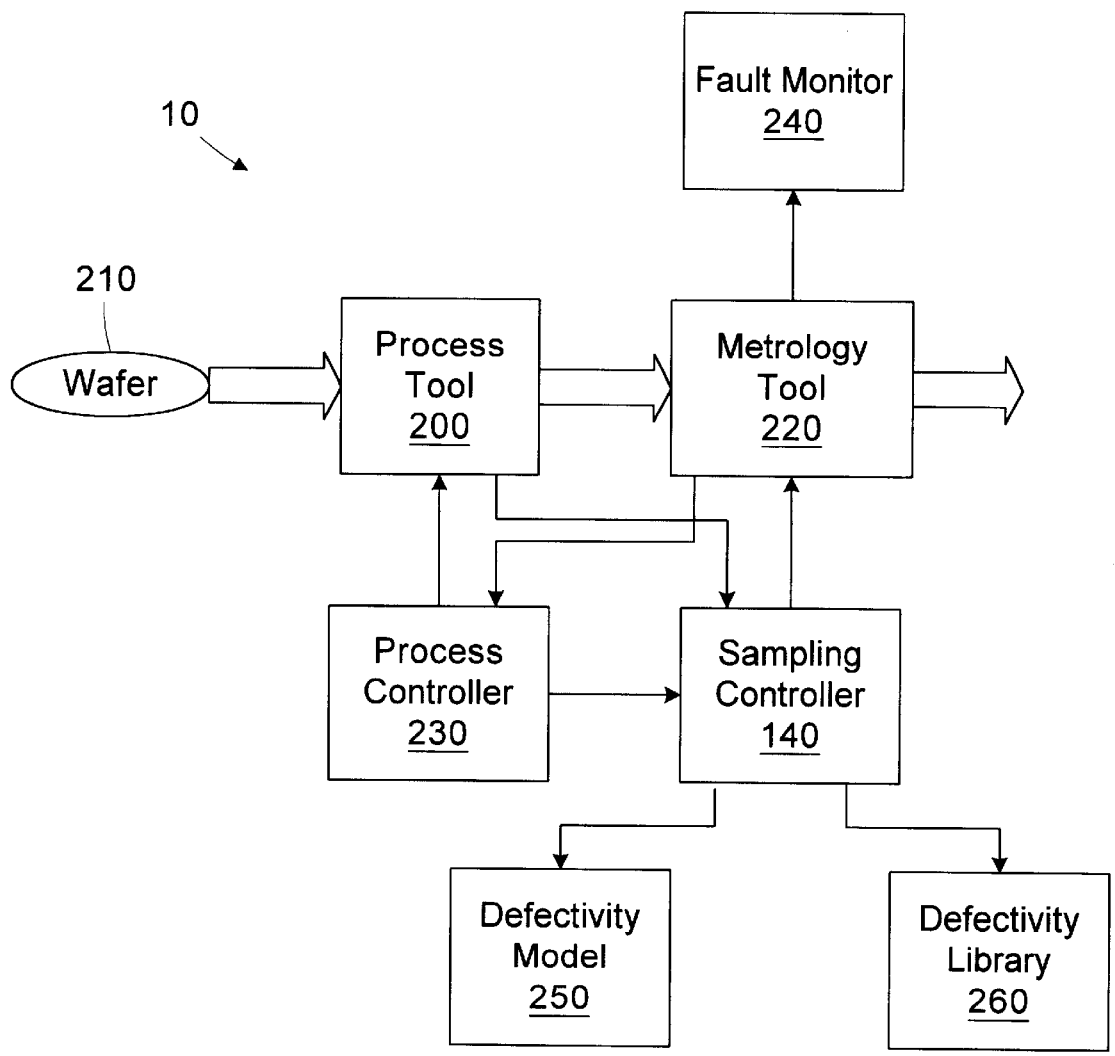
FIG. 2 is a simplified block diagram of a portion of the manufacturing system of FIG. 1.

Referring now to FIG. 2, a simplified block diagram of a portion of the manufacturing system of FIG. 1 is provided. A process tool 200 (e.g., one of the tools 30–80) processes wafers 210 according to one of a plurality of operating recipes. The process tool 200 may also be a single chamber of a multiple chamber tool 30–80. A metrology tool 220 (e.g., one of the tools 30–80) measures output characteristics of the wafers processed in the process tool 200 to gauge the efficacy of the process implemented by the process tool 200. The metrology data collected by the metrology tool 220 may be passed to a process controller 230 for dynamically updating the operating recipe of the process tool 200 to reduce variation between the measured output characteristic and a target value for the characteristic. The metrology collected by the metrology tool 200 may also be passed to a fault monitor 240 for fault detection and classification. If the measured output characteristic is outside tolerable limits, the fault monitor 240 may reject the wafer and the wafer may be reworked or scrapped and/or the process tool 200 may be taken out of service for maintenance.

The sampling controller 140 interfaces with the metrology tool 220 and determines a sampling plan for the metrology tool 220 based on the particular operating recipe implemented by the process tool and the expected defectivity of the process implemented using the particular operating recipe, as described in greater detail below.

The sampling controller 140 may receive the operating recipe parameters from the process controller 230, the process tool 200, or the MES Server 90, depending on the particular implementation. For example, in an implementation where no automatic process control is used (i.e., no process controller 230), the MES server 90 may pass a default operating recipe to process tool 200 based on the particular processed needed. The sampling controller 140 may receive the default operating recipe from either the process tool 200 or the MES server 90. In an implementation with automatic process control, the MES server 90 may provide a default operating recipe that is modified over time by the process controller 230 to achieve its process target goals. In such a case, the sampling controller 140 may receive the modified operating recipe from either the process controller 230 or the process tool 200. In yet another alternative embodiment, the sampling controller 140 may use the default operating recipe for determining the sampling plan even though the actual operating recipe may have been modified by the process controller 230.

Although the process tool 200, sampling controller 140, process controller 230, and metrology tool 220 are illustrated as separate units, they may be combined into a single unit or a different number of common units in some embodiments. The particular process performed by the process tool 200 and the particular output characteristic measured by the metrology tool 220 may vary widely. The instant invention is applicable to a wide variety of process tools 200 related or not to semiconductor processing, and the output characteristic measured by the metrology tool 220 may be selected from a wide range of output characteristics applicable to the particular product or workpiece being processed or the particular process being performed. For example, the output characteristic measured by the metrology tool 220 to gauge the efficacy of the process tool 200 may include physical characteristics, electrical characteristics, or defect characteristics. Exemplary parameters include, but are not limited to, process layer thickness, critical dimensions (e.g., line width), across-wafer variation, resistivity, particle defect counts, missing pattern defect counts, extra pattern defect counts, electrical defects, etc.

Depending on the particular nature of the process tool 200, it may process single wafers 30, a group or lot of wafers 210, or a plurality of lots of wafers 210 (i.e., a batch). The particular sampling plan determined by the sampling controller 140 may depend at least in part on the number of wafers 210 processed concurrently.

Based on the operating recipe implemented by the process tool 200, the sampling controller 140 determines a defectivity measure, or metric, associated with the operating recipe and in turn determines the sampling plan for the metrology tool 220 based on the defectivity metric. There are various techniques that the sampling controller 140 may use to determine the defectivity metric. In one embodiment, the sampling controller 140 may access a defectivity model 250 using the operating recipe parameters to calculate the defectivity metric. Again, the default operating recipe may be used or the modified operating recipe determined by the process controller 230 may be used. Various modeling techniques, well known to those of ordinary skill in the art, are suitable for implementing the defectivity model 250. The defectivity model 250 may be developed empirically using commonly known linear or non-linear techniques. The defectivity model 250 may be a relatively simple equation based model (e.g., linear, exponential, weighted average, etc.) or a more complex model, such as a neural network model, principal component analysis (PCA) model, or a projection to latent structures (PLS) model. The specific implementation of the defectivity model 250 may vary depending on the modeling technique selected.

In another embodiment, the sampling controller 140 may access a defectivity library 260 including a plurality of reference operating recipes. Each reference operating recipe has an associated defectivity metric. The sampling controller 140 compares the current operating recipe (i.e., actual or default) to the entries in the defectivity library 260 and identifies the reference operating recipe closest to the current operating recipe. Techniques for matching the current operating recipe to the closest reference operating recipe are well known to those of ordinary skill in the art, so they are not described in greater detail herein. For example, a minimum least squares or nearest neighbor approach may be used.

After determining the defectivity metric, the sampling controller 140 implements a sampling plan for the metrology tool 220 that factors in the expected defectivity. If the defectivity metric corresponds to a higher level of expected defectivity, the measurement frequency is increased. Similarly, the measurement frequency may be decreased responsive to a defectivity metric corresponding to a relatively lower level of expected defectivity. For example if the defectivity metric is above a predetermined threshold (i.e., a default defectivity), the measurement frequency may be increased proportional to the defectivity metric. Likewise, if the defectivity metric is below the default defectivity, the measurement frequency may be decreased proportionally.

The sampling plan is directed to the wafers processed using the particular operating recipe used to generate the defectivity metric. The MES server 90 may store data in the data store 110 identifying specific wafers or lots of wafers (e.g., by wafer identification or lot identification codes) and the operating recipe parameters used to process the wafer or lot. The process controller 230 may provide the MES server 90 with the appropriate operating recipe data for modified operating recipes. The sampling controller 140 may then develop a sampling plan particular to the wafers processed using each operating recipe iteration. The scale on which the sampling plan is implemented depends on the particular nature of the process tool 200. If the process tool 200 processes single wafers 210, the sampling plan may specify the frequency at which subsequent wafers 210 processed by the process tool 200 using the current operating recipe are measured by the metrology tool 220. In another embodiment, if the process tool 200 processes lots or batches (i.e., multiple lots) of wafers 210, the sampling plan may specify the number of wafers 210 in the lot or batch that is to be measured. For example, for a lot processed using an operating recipe having a relatively high defectivity metric, the sampling plan may specify a measurement frequency of 40% of the wafers 210, while for a lot having a lower defectivity metric, the sampling plan may specify a measurement frequency of 10% of the wafers 210.

Figure 3:
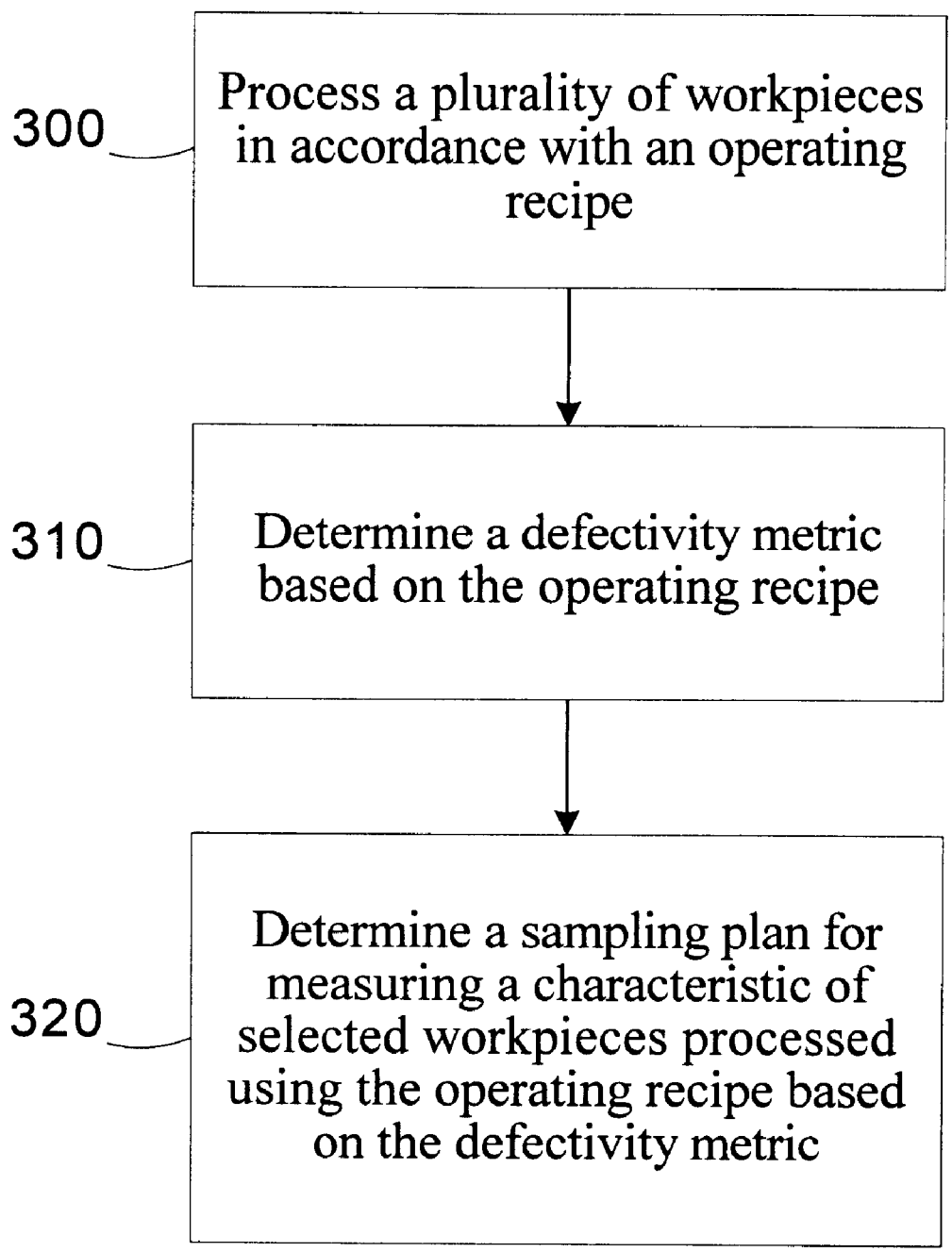
FIG. 3 is a simplified flow diagram of a method for determining a sampling plan based on defectivity in accordance with another illustrative embodiment of the present invention.

Turning now to FIG. 3, a simplified flow diagram of a method for determining a sampling plan based on defectivity in accordance with another illustrative embodiment of the present invention is provided. In block 300, a plurality of workpieces is processed in accordance with an operating recipe. In block 310, a defectivity metric is determined based on the operating recipe. In block 320, a sampling plan for measuring a characteristic of selected workpieces processed using the operating recipe is determined based on the defectivity metric.

Applying sampling plans based on defectivity expectations, as described herein, provides numerous advantages. First, fault classification and detection effectiveness may be improved because a higher number of wafers 210 having higher expected defectivity rates are measured. Second, process efficiency is improved because the amount of metrology resources expended may be reduced for operating receives having lower expected defectivity rates. This reduction increases the throughput of the manufacturing system 10.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    processing a plurality of workpieces in accordance with an operating recipe;
    determining a defectivity metric based on the operating recipe; and
    determining a sampling plan for measuring a characteristic of selected workpieces processed using the operating recipe based on the defectivity metric.

2. The method of claim 1, further comprising measuring the characteristic of the selected workpieces based on the sampling plan.

3. The method of claim 2, wherein measuring the characteristic comprises measuring at least one of a physical characteristic, an electrical characteristic, and a defect characteristic.

4. The. method of claim 1, wherein determining the defectivity metric further comprises:
    comparing the operating recipe to a library of reference operating recipes, each reference operating recipe having an associated defectivity metric;
    selecting the reference operating recipe closest to the operating recipe; and
    selecting the defectivity metric associated with the selected reference operating recipe.

5. The method of claim 1, wherein determining the defectivity metric further comprises applying a defectivity model to the operating recipe.

6. The method of claim 1, wherein processing the workpiece in accordance with the operating recipe further comprises:
    receiving a default operating recipe;
    modifying the default operating recipe responsive to automatic process control actions; and
    processing the workpieces in accordance with the modified operating recipe.

7. The method of claim 6, wherein determining the defectivity metric based on the operating recipe further comprises determining the defectivity metric based on the default operating recipe.

8. The method of claim 6, wherein determining the defectivity metric based on the operating recipe further comprises determining the defectivity metric based on the modified operating recipe.

9. The method of claim 1, wherein the sampling plan include a measurement frequency and determining the sampling plan further comprises increasing the measurement frequency proportional to the defectivity metric responsive to the defectivity metric being greater than a predetermined threshold.

10. The method of claim 1, wherein the sampling plan include a measurement frequency and determining the sampling plan further comprises decreasing the measurement frequency proportional to the defectivity metric responsive to the defectivity metric being less than a predetermined threshold.

11. The method of claim 1, wherein the plurality of workpieces are grouped into sets and determining the sampling plan further comprises determining a number of workpieces in each set to be measured.

12. A method, comprising:
    processing a plurality of workpieces in accordance with one of a plurality of operating recipes, each operating recipe having an associated defectivity metric; and
    determining a sampling plan for measuring a characteristic of selected workpieces processed using a selected one of the operating recipes based on the associated defectivity metric.

13. The method of claim 12, further comprising measuring the characteristic of the selected workpieces based on the sampling plan.

14. The method of claim 13, wherein measuring the characteristic comprises measuring at least one of a physical characteristic, an electrical characteristic, and a defect characteristic.

15. The method of claim 12, wherein the sampling plan include a measurement frequency and determining the sampling plan further comprises increasing the measurement frequency proportional to the defectivity metric responsive to the defectivity metric being greater than a predetermined threshold.

16. The method of claim 12, wherein the sampling plan include a measurement frequency and determining the sampling plan further comprises decreasing the measurement frequency proportional to the defectivity metric responsive to the defectivity metric being less than a predetermined threshold.

17. The method of claim 12, wherein the plurality of workpieces are grouped into sets and determining the sampling plan further comprises determining a number of workpieces in each set to be measured.

18. A manufacturing system, comprising:
   a process tool configured to process a plurality of workpieces in accordance with an operating recipe; and
   a sampling controller configured to determine a defectivity metric based on the operating recipe and determine a sampling plan for measuring a characteristic of selected workpieces processed using the operating recipe based on the defectivity metric.

19. The system of claim 18, further comprising a metrology tool configured to measure the characteristic of the selected workpieces based on the sampling plan.

20. The system of claim 19, wherein the metrology tool is configured to measure at least one of a physical characteristic, an electrical characteristic, and a defect characteristic.

21. The system of claim 18, wherein the sampling controller is further configured to compare the operating recipe to a library of reference operating recipes, each reference operating recipe having an associated defectivity metric, select the reference operating recipe closest to the operating recipe, and select the defectivity metric associated with the selected reference operating recipe.

22. The system of claim 18, wherein the sampling controller is further configured to apply a defectivity model to the operating recipe to determine the defectivity metric.

23. The system of claim 18, further comprising a process controller associated with the process tool and being configured to receive a default operating recipe, and modify the default operating recipe responsive to automatic process control actions, the process tool being further configured to process the workpieces in accordance with the modified operating recipe.

24. The system of claim 23, wherein the sampling controller is further configured to determine the defectivity metric based on the default operating recipe.

25. The system of claim 23, wherein the sampling controller is further configured to determine the defectivity metric based on the modified operating recipe.

26. The system of claim 18, wherein the sampling plan include a measurement frequency and the sampling controller is further configured to increase the measurement frequency proportional to the de fectivity metric responsive to the defectivity metric being greater than a predetermined threshold.

27. The system of claim 18, wherein the sampling plan include a measurement frequency and the sampling controller is further configured to decrease the measurement frequency proportional to the defectivity metric responsive to the defectivity metric being less than a predetermined threshold.

28. The system of claim 18, wherein the plurality of workpieces are grouped into sets and the sampling controller is further configured to determine a number of workpieces in each set to be measured.

29. A system, comprising:
   a process tool configured to process a plurality of workpieces in accordance with one of a plurality of operating recipes, each operating recipe having an associated defectivity metric; and
   a sampling controller configured to determine a sampling plan for measuring a characteristic of selected workpieces processed using a selected one of the operating recipes based on the associated defectivity metric.

30. The system of claim 29, further comprising a metrology tool configured to measure the characteristic of the selected workpieces based on the sampling plan.

31. The system of claim 30, wherein the metrology tool is further configured to measure at least one of a physical characteristic, an electrical characteristic, and a defect characteristic.

32. The system of claim 29, wherein the sampling plan include a measurement frequency and the sampling controller is further configured to increase the measurement frequency proportional to the defectivity metric responsive to the defectivity metric being greater than a predetermined threshold.

33. The system of claim 29, wherein the sampling plan include a measurement frequency and the sampling controller is further configured to decrease the measurement frequency proportional to the defectivity metric responsive to the defectivity metric being less than a predetermined threshold.

34. The system of claim 29, wherein the plurality of workpieces are grouped into sets and the sampling controller is further configured to determine a number of workpieces in each set to be measured.

35. A manufacturing system, comprising:
   means for processing a plurality of workpieces in accordance with an operating recipe;
   means for determining a defectivity metric based on the operating recipe; and
   means for determining a sampling plan for measuring a characteristic of selected workpieces processed using the operating recipe based on the defectivity metric.

\* \* \* \* \*